United States Patent [19]
Asano

[11] Patent Number: 4,583,436
[45] Date of Patent: Apr. 22, 1986

[54] APPARATUS FOR TRIMMING ARTICLES MOLDINGLY FORMED ON PLASTIC SHEET

[75] Inventor: Kazuo Asano, Nagoya, Japan

[73] Assignee: Kabushiki Kaisha Asano Kenkyusho, Aichi, Japan

[21] Appl. No.: 642,980

[22] Filed: Aug. 21, 1984

[30] Foreign Application Priority Data

Dec. 23, 1983 [JP] Japan ................................ 58-247406

[51] Int. Cl.$^4$ ............................................. B26D 7/02
[52] U.S. Cl. ..................................... 83/104; 83/151; 83/155; 83/214; 83/277; 83/516; 83/564; 83/614; 83/914
[58] Field of Search ................. 83/104, 151, 155, 277, 83/213, 214, 455, 614, 914, 563, 564, 559, 560, 516, 519

[56] References Cited

U.S. PATENT DOCUMENTS 4,131,224 12/1978 Gerber et al. ................... 83/277 X
4,348,924 9/1982 Jenkner .............................. 83/277 X
4,505,174 3/1985 Carithers, Jr. ......................... 83/455

Primary Examiner—Frank T. Yost
Attorney, Agent, or Firm—Jordan and Hamburg

[57] ABSTRACT

Apparatus for longitudinally and transversely trimming articles moldingly formed on plastic sheet which is brought by means of a pair of clamp chains between longitudinally movable pointed tip knives and longitudinally extended holder members as well as transversely movable pointed tip knives and transversely extended holder members respectively held in retracted position and then trimmed by moving said knives and holder members to forwarded position and by moving said knives. Trimmed articles fall down by gravity and the waste portion is kept in one piece and brought out by said clamp chains to be collected.

13 Claims, 11 Drawing Figures

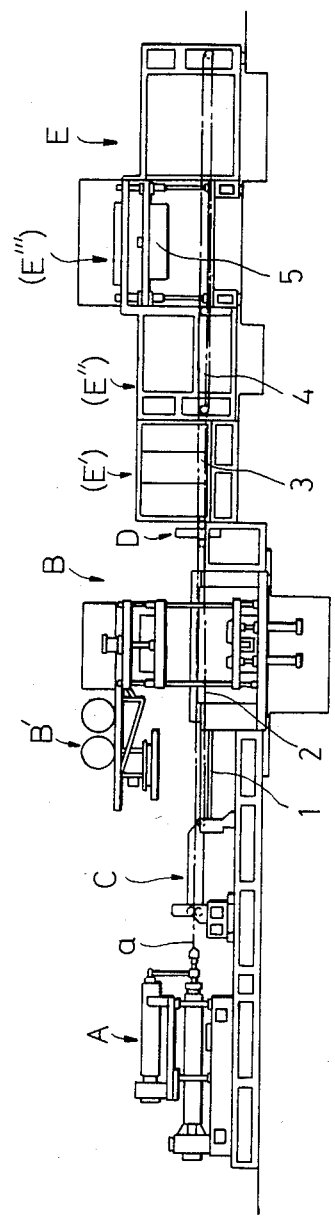
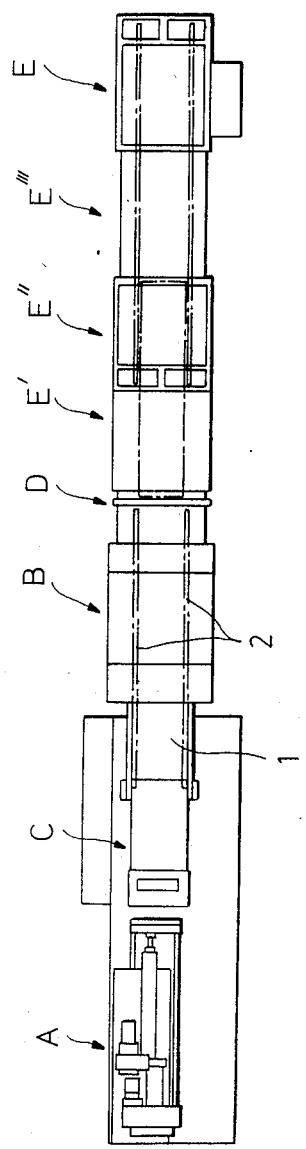

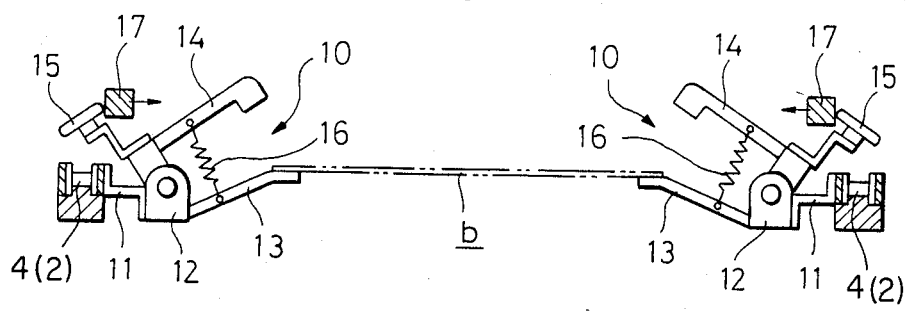
Fig. 3
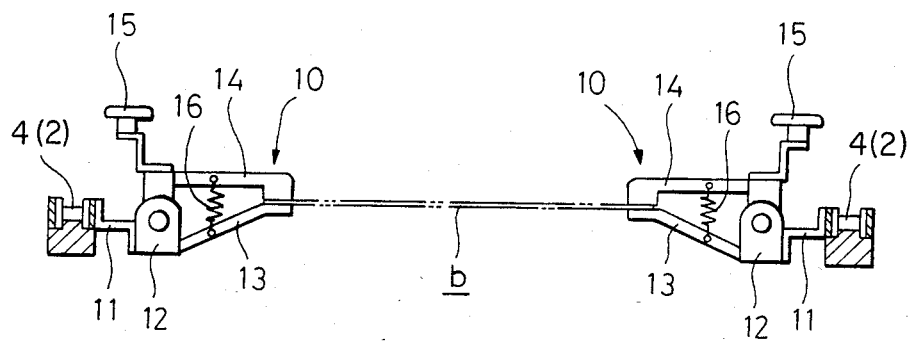
Fig. 4
Fig. 5
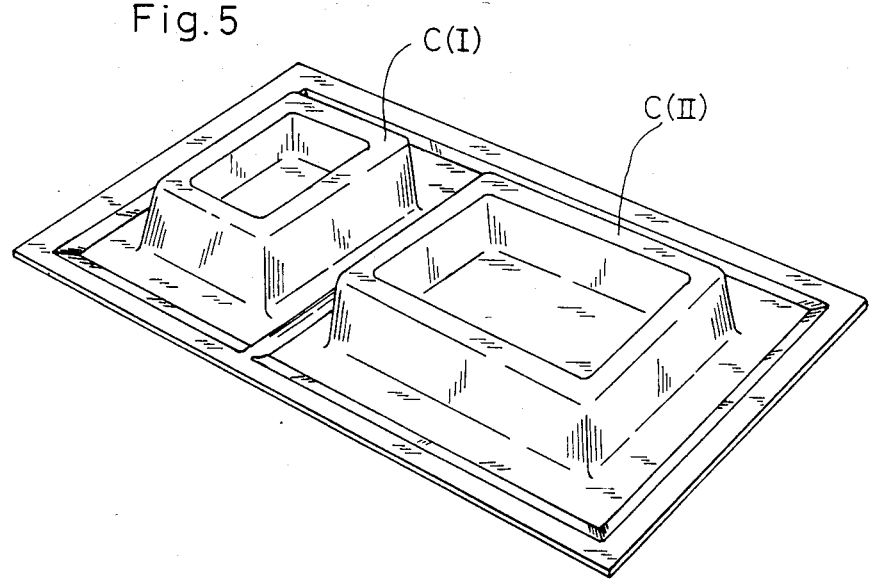

APPARATUS FOR TRIMMING ARTICLES MOLDINGLY FORMED ON PLASTIC SHEET

BACKGROUND OF THE INVENTION

The present invention relates to an apparatus for longitudinally and transversely trimming articles moldingly formed on the plastic sheet.

Various articles are formed by feeding a heated and softened thermoplastic web between a pair of male and female dies which are normally separated and by bringing said dies engaged together. Said dies may be subjected to raised or reduced pressure as occasion demands. Rectangular articles such as bath tubs, refrigerator inner rooms and the like have been manufactured according to such method. For instance, the freezing compartment and the cooling compartment of the refrigerator, the former being smaller in general than the latter, are preferably formed by one shot of the forming machine operation for the convenience of assembly.

The unnecessary portion of the plastic sheet surrounding the formed articles must be trimmed. Conventionally, a set of upper and lower frames, each comprising four or more blades so arranged as to correspond to the four or more lines of the plastic sheet to be severed have been used so that transverse and longitudinal trimmings are made in one shot by relatively moving said set of frame blades in a vertical direction to engage with each other. According to such conventional trimming method, the cut-off waste portion of the plastic sheet is in one piece like a picture frame held by a pair of clamp link chains along opposite side edges thereof so as to efficiently recover much of the waste.

According to such conventional trimming device, however, every time a size of the article to be formed is varied, the set of trimming frame blades must be exchanged which necessitates many sets of blades of various sizes to be stored, which is space and time consuming. When the trimming device is combined with the moldingly forming machine, which is in turn usually combined with an extruder feeding plastic web thereto, so as to be intermittently operable in synchronized relation therewith, said forming machine and further said extruder if it is combined therewith must be stopped during such time consuming blade exchange work.

SUMMARY OF THE INVENTION

The object of the invention is, thus, to provide a trimming apparatus adapted to avoid said defects.

Said object may be attained according to the invention fundamentally by providing a trimming apparatus comprising a set of longitudinally shiftable transversely movable pointed tip knives and a set of transversely shiftable longitudinally movable pointed tip knives, respectively normally held in retracted position but movable to be brought in forwarded position where each pointed tip of said knives engages with the plastic sheet, said knives being so arranged that the distances between the concerned knives may be adjusted by correspondingly shifting and the plastic sheet may be trimmed by moving said knives which have been brought in said forwarded position.

It is not always necessary but actually preferable to provide a set of longitudinally shitable transversely extended holder members and a set of transversely shiftable longitudinally extended holder members, respectively normally held in retracted position but movable so as to be brought in forwarded position where each member holds the plastic sheet along the respective line to be severed to cooperate with the respective counterpart knife, said holder members being so arranged that the distances between the concerned holder member may be adjusted by correspondingly shifting.

When the knives for longitudinal and transverse severing are separately provided, however, the waste sheet portion is to be divided into a plurality of pieces, which is not preferable for the reason referred to above.

The other object of the invention according to another aspect thereof is, thus, to make it possible to avoid such defects, or in other words to leave a waste plastic sheet portion in one piece despite using separate longitudinally and transversely severing knives.

Such object may be attained according to the invention fundamentally by providing longitudinally and transversely extending bent ridges formed on the plastic sheet so that said pointed knives brought in the respective forwarded position may sever the plastic sheet except said ridges to which each pointed tip of said knives cannot reach.

The other objects and advantages of the invention may be appreciated by studying the following explanation to be made hereafter with reference to the accompaying drawings.

BRIEF DESCRIPTION OF THE DRAWINGS

FIG. 1 is a schematic side elevation of a line of an extruder and a molding forming machine with which the trimming apparatus of the invention is combined, FIG. 2 is a schematic top plan view of the above, FIGS. 3 and 4 are schematic views showing a pair of clamp link chains for gripping the continuously fed plastic web at the opposite side edges thereof at the area of the molding forming machine and the plastic sheet cut in a specific length on which the articles are formed at the area of the trimming apparatus of the invention respectively in the inactive position and the clamp position, FIG. 5 is a perspective view of the plastic sheet on which two articles as well as longitudinally and transversely extending bent ridges are formed according to another aspect of the invention.

DESCRIPTION OF THE PREFERRED EMBODIMENT

Figure 6:
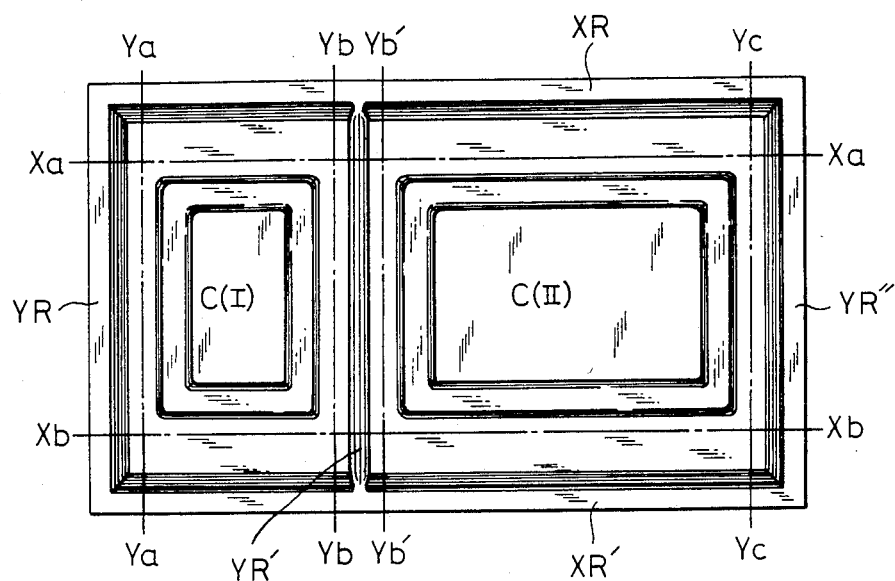
FIG. 6 is a top plan view of the above.

With reference to FIGS. 1 and 2, it is explained how the trimming apparatus according to the invention is combined with a conventional extruder-forming machine.

An extruder having a die for continuously extruding a thermoplastic web a is generally represented by A. A forming machine represented generally by B has a pair of dies respectively movable in a vertical direction by means of hydraulic or pneumatic piston-cylinder devices to be engaged for forming articles from the plastic web a fed therebetween, which is preferably provided with a heating device B'. In order to settle the discrepancy caused by continuous extruding of the plastic web which must intermittently be fed to the forming machine, there is arranged a mechanism C therebetween. Since not only said extruder A and molding forming machine B but also such mechanism C are in public knowledge and have no direct connection with the invention, there will be no need for further detailed explanation.

It is added only that there is provided an endless belt conveyor 1 so as to supply the continuously extruded plastic web a to the forming machine B. Since the upper and lower dies must be engaged together when holding said plastic web a therebetween for forming, said belt conveyor 1 can not run through the forming machine B. Thus, a pair of endless clamp link chains 2, 2 are provided so as to grip side edges of said plastic web a to be brought into and out of said forming machine B, as well known to those skilled in the art.

At the outlet of the machine B, there is provided a cutting device D so as to cut the endlessly extending plastic web a on which articles are formed into a lenght of plastic sheet b to be trimmed.

The plastic sheet b formed with articles such as C(I) and C(II) shown in FIG. 5 is received by an endless belt conveyor 3 in a trimming apparatus of the invention generally represented by E.

Before the plastic sheet b on which articles are formed enters the trimming apparatus E where a set of longitudinally and transeversely movable pointed tip knives as well as a set of longitudinally and transversely extended holder members are provided, it is preferable to provide a chamber (E') for cooling said sheet b, a positioning device (E''), and a boring device (E''').

When said plastic sheet b is carried by said belt conveyor 3 through said cooling zone (E') into the positioning zone (E''), said conveyor 3 is stopped in response to any usual means such as a limit switch signal and the position of the plastic sheet b formed with articles on the conveyor is detected and corrected in preparation for correct severing.

In response to a signal generated in any switchable manner, a pair of clamp link chains 4 are actuated to grip the sheet b along the opposite side edges thereof and driven to carry said plastic sheet b into the boring zone (E''') and stopped there. A die 5 having a necessary number of drills is lowered e.g. by a hydraulic device onto the articles to bore the corresponding number of holes for water drain, cooled air circulation and the like.

Then, the clamp link chains 4, 4 are driven again in response to a signal caused by e.g. a limit switch actuated by movement of said die 5 to carry the sheet b into the main frame of the trimming apparatus E.

Before entering a detailed explanation of arrangement of the concerned members and operation thereof in the apparatus E, it will be preferable for ready understanding thereof to make brief explanations on said clamp link chains 4, 4 which are the same as the endless chains 2, 2 for the forming machine B and on relationship of the longitudinally and transversly movable pointed tip knives to the transversely and longitudinally etending ridges formed on the plastic sheet.

With reference to FIGS. 3 and 4, each of a pair of endless link chains 4, 4 (2, 2) is provided with a plurality of clamp means represented generally by 10. The clamp means 10 comprises a bracket 11 fixed to a link of the chain, a block member 12 fixed to said bracket 11, an arm 13 fixed to said block member 12 at the root thereof and projecting inward so that the plastic sheet b having articles formed thereon (continous plastic web a in respect of the clamp chain 2 for the forming machine B) may be held on the free end of said arm 13, and an angularly movable arm 14 pivoted on said block member 12 at the root portion thereof, and a rotatable wheel 15 having a pivotal axle on said block member 12 so as to be rotated on said axle.

Said two arms 13 and 14 has a coiled spring means 16 having ends which are fixed respectively to said arms 13, 14 so that the free ends thereof may grip the plastic sheet b (or web a) at the side edge thereof.

As shown in FIG. 3, however, said wheel 15 is normally abuts on a rail 17 so that said pivotally movable arm 14 is kept in the open position against the force of said spring means 16. When said rail 17 is moved away in response to a signal, said movable arm 14 is pivotally moved by means of said spring means 16 to grip the plastic sheet b (or plastic web a) as shown in FIG. 4.

With in reference to FIGS. 5, 6, 7 and 8, the plastic sheet b has articles C(I) such as a freezing compartment casing for a refrigerator and articles (II) such as a cooling compartment casing formed thereon. The peripheral portion surrounding said articles must be trimmed.

The plastic sheet b is to be trimmed along two longitudinal lines X-a and X-b by means of longitudinally movable pointed tip knives, which are transversely shiftable so as to adjust the distance between said two lines.

When two articles are formed on the plastic sheet b, trimming is to be made along four transverse lines Y-a, Y-b, Y-b' and Y-c by means of four transversely movable pointed tip knives, which are longitudinally shiftable so as to adjust the distances between said four lines or three lines as occasion demands where the distance between the lines Y-b and Y-b' is fixed.

The upwardly protruded ridges to be formed for the purpose referred to above concurrently with forming articles C(I) and C(II) are illustrate, by longitudinally extending XR and XR' and YR, YR' and transversely extending ridges YR and YR'.

Figure 7:
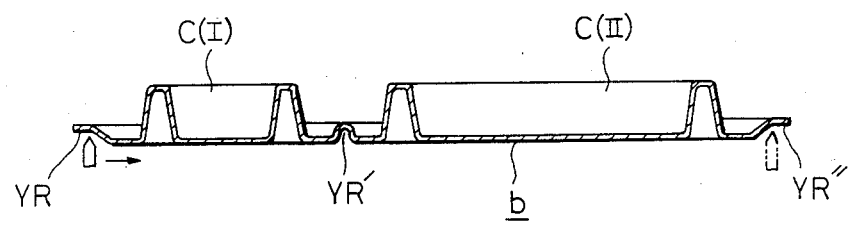
FIGS. 7 and 8 are side and end views of the above showing the positional relation of the knife in the forwarded position to the bent ridges of the plastic sheet.
Figure 8:
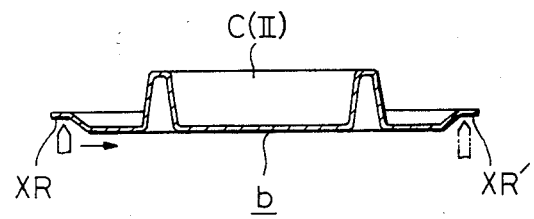

The meaning of providing such ridges is to be readily appreciated by glancing at FIGS. 7 and 8, the former being a section taken along a longitudinal center line in FIG. 5 and the latter a section taken along a transverse center line therein, in which, when the longitudinally and transversely movable knives are moved from the position where they are illustrated by solid lines to the position of phantom lines or vice versa, each pointed tip of said knives can not reach the sheet at the ridges XR, XR' as well as YR, YR' and YR'' so that the waste portion is cut off from the articles in one piece.

Since the upwardly protruded ridges XR, XR' (FIG. 8) are gripped by clamps 10 as shown in FIG. 4, the articles (I) and (II) respectively cut off from the sheet b fall down by gravity to be collected. If the waste plastic sheet portion surrounding said articles is not in one piece some waste pieces will fall down together with said articles, which causes troublesome manual work for collecting said waste pieces to be recycled to the extruder.

Figure 9:
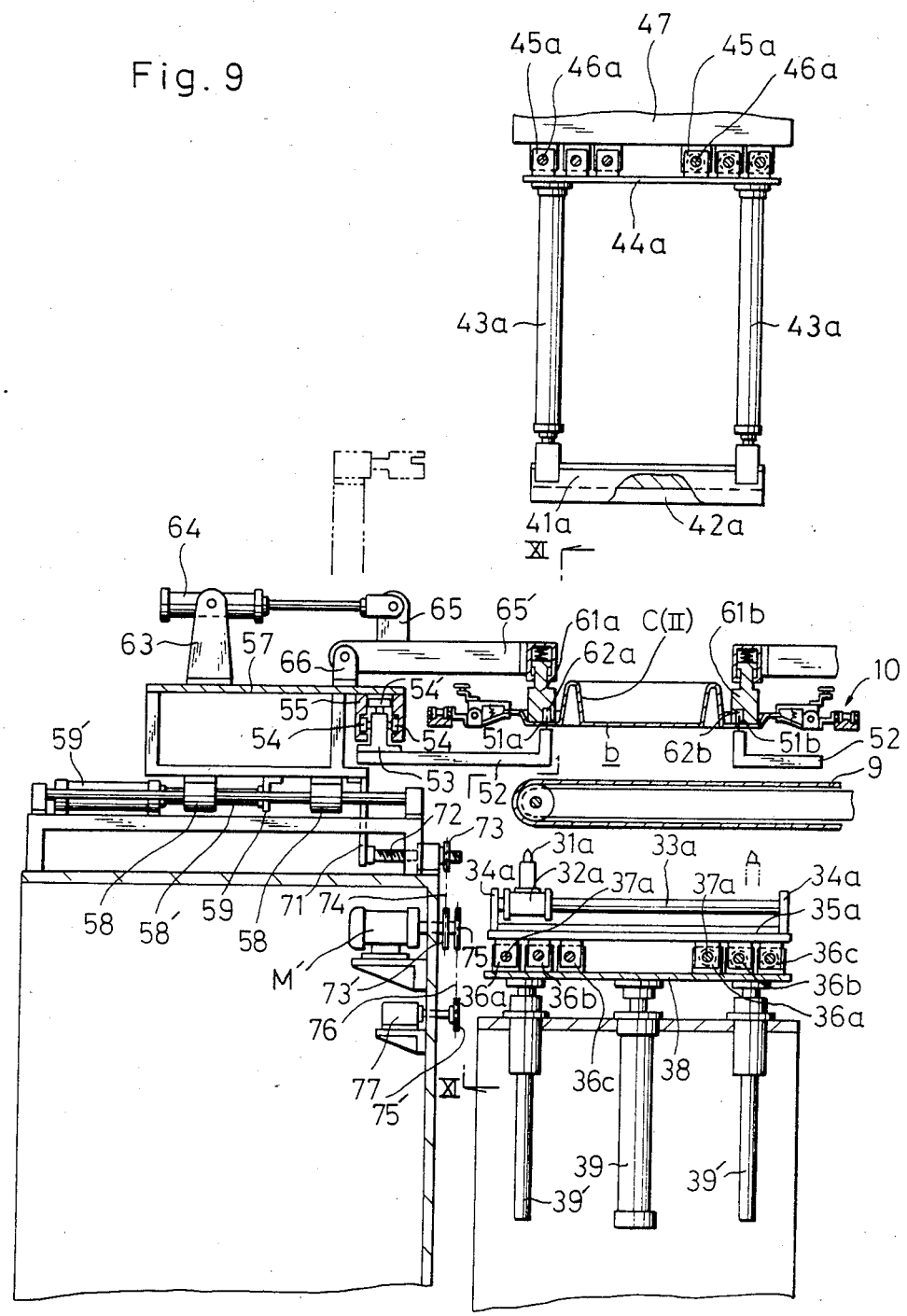
FIG. 9 is a front plan view partly in section of the main portion of the trimming device of the invention, in which the longitudinally movable knives are shown in forwarded position for severing but the transversely movable knives are shown in retracted position.

With reference to FIG. 9, there is shown a plastic sheet b formed with the article C(II) and upwardly bent ridges XR, XR' as shown in FIG. 8 in the center of the right side therein. The sheet b is gripped by means of clamps 10, 10 at the opposite side edges thereof.

Beneath said sheet b, there are provided transversely movable knives 31a (31b, 31b', 31c) for severing said sheet b respectively along transverse lines Ya (Yb, Yb', Yc) shown in FIG. 6 in retracted position as well as concerned mechanisms for moving said knife 31a between said retracted position and forwarded position which is a raised position in this embodiment, for driving said knife 31a transversely to sever and for shifting said knife longitudinally to adjust the distance therefrom to the adjacent knife 31b.

Above said sheet b, there is provided a transversely extended holder member 41a (41b, 41b', 41c) formed with extended channel 42a (42b, 42b', 42c) in the bottom thereof in retracted position as well as concerned mechanisms for moving said holder member 41a between said retracted position and forwarded position which is a lowered position in this embodiment to cooperate with the forwarded counterpart knife 31a for effectively severing and for shifting said holder member 41a to adjust the distance therefrom to the adjacent holder member 41b.

There is shown an endless belt conveyor 9 between the plastic sheet b and the transversely movable knife 31a, by which the formed articles separated from the sheet are received to be transversely taken out of the trimming apparatus. More detailed explanation shall be made later.

There are shown longitudinally movable transversely shiftable knives 51a and 51b and longitudinally extended transversely shiftable holder members 61a and 61b respectively in forwarded position so that each pointed tip of said knives 51a, 51b may longitudinally sever the sheet b with aid of said holder members 61a, 61b respectively having longitudinally extended grooves 62a, 62b formed in the bottom thereof.

The concerned mechanisms for moving said knife 51a to longitudinally sever the sheet b and transversely shifting said knife 51a to adjust the position therof in the transverse direction as well as for moving the longitudinally extended holder member 61a between retracted position and forwarded position and transversely shifting said holder member 61a to adjust the position in the transverse direction are shown in the left side of FIG. 9.

The concerned mechanisms for the knife 51b and the counter part holder member 61b are just the same as the above so that illustration is omitted in this figure.

Figure 10:
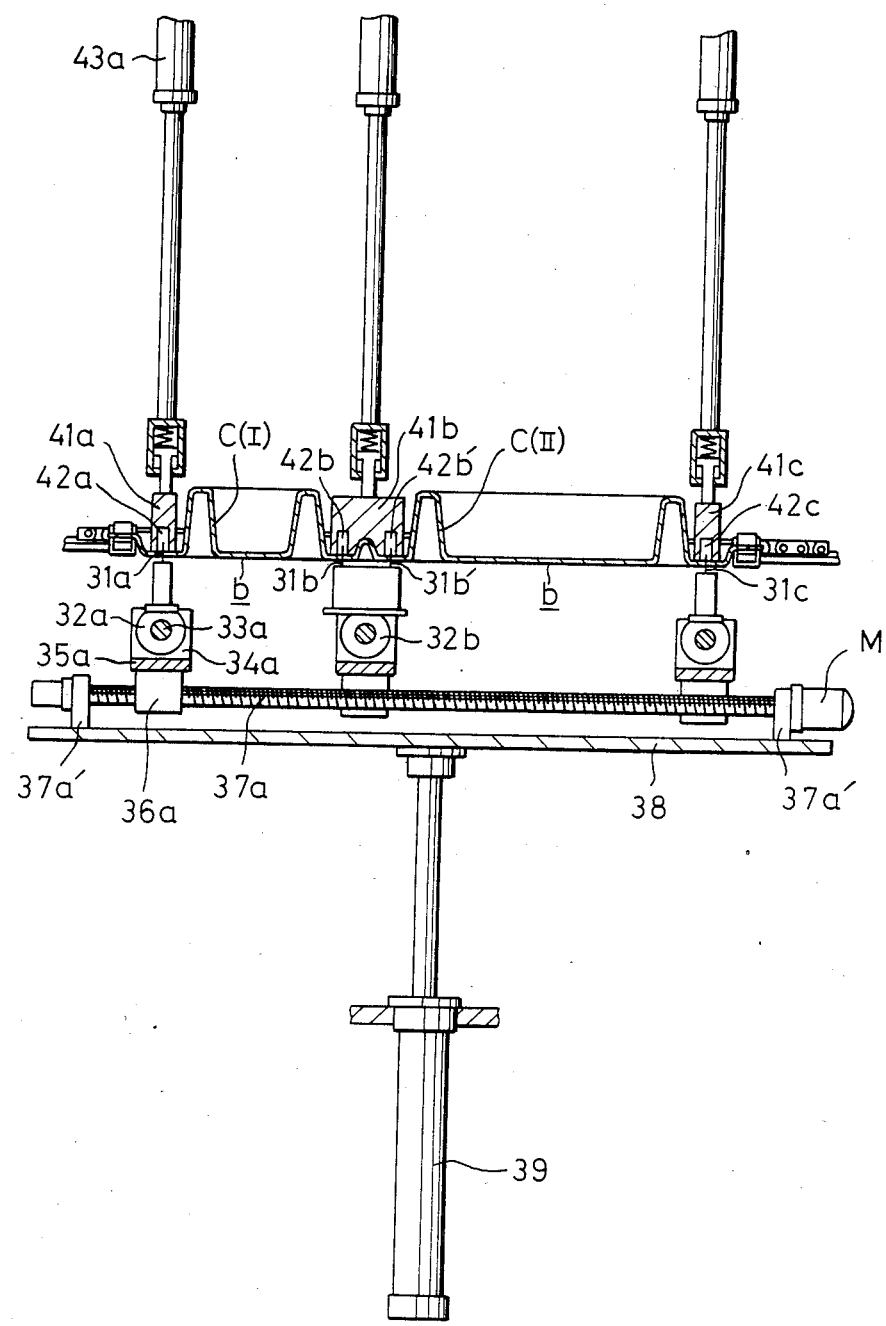
FIG. 10 is a side elevation of the transversely movable knives in the forwarded position and concerned portions of the severing apparatus and FIG. 11 is a side elevation seen along a line XI—XI and arrows shown in FIG. 9.

With reference also to FIG. 10 which shows transversely movable longitudinally shiftable knives 31a, 31b, 31b' and 31c as well as transversely extended longitudinally shiftable holder members 41a, 41b and 41c respectively in forwarded position for severing, seen in the direction normal to that of FIG. 9, arrangement and operation thereof shall be explained in more detail with respect to the knife 31a and the holder member 41a as well as the concerned mechanism which can be applied as it is to other knives and holder members as well as the concerned mechanisms therefor.

The pointed tip knife 31a is exchangeably mounted on a rodless cylinder 32a which is mounted on a transversely extended guide bar 33a to be pneumatically or hydraulically slidingly moved therealong. Concerned members for pneumatic or hydraulic movement are omitted for the sake of clarification of the drawing. Of course it may be driven by any other means. Said bar 33a is held by a frame comprising a pair of end flanges 34a, 34a and a base 35a transversely extended therebetween.

Under said base 35a there are fixedly provided a pair of block members 36a, 36a each having a threaded groove so as to threadedly engage with a longitudinally extending screw rod 37a. When a pair of screw rods 37a, 37a are synchronizedly rotated by means of a prime mover such as a reversible electric motor M, the assembly comprising the pointed tip knife 31a may be longitudinally shifted in either direction for position adjustment. In FIG. 9 there are shown two pairs of block members 36b, 36b; 36c, 36c in additional to said pair of block members 36a, 36a. Said longitudinally extended screw rod 37a is supported by a pair of flanges 37a', 37a' which are fixed on a base plate 38.

The base plate 38 may support not only the assembly comprising the knife 31a but also those for the knives 31b, 31b' and 31c. Said plate 38 is supported by a hydraulic piston-cylinder device represented generally by 39 so as to move the knives assembly from the retracted position illustrated in FIG. 9 to the forwarded position shown in FIG. 10. It is preferable to provide guide means 39', 39' as shown in FIG. 9 for ensuring stable vertical movement.

It is added that the knives 31b and 31b' are mounted on a single common cylinder 32b in this embodiment as shown in FIG. 10. Of course it is possible to provide separate cylinders and separate block member so that the distance between said two knives 31b and 31b' may be adjusted.

Said holder member 41a having the transversly extended channel 42a is held by the respective lower ends of the pistons of a pair of hydraulic piston-cylinder devices represented by 43a, 43a. It is preferable to provide spring means therebetween as shown in FIG. 10 in order to ensure reliable engagement of the holder member 41a with the pointed tip of the counterpart knife 31a and mild contact thereof on the plastic sheet b. When actuating said hydraulic piston-cylinder device 43a, the holder member 41a may be forwarded or lowered from the position shown in FIG. 9 to that shown in FIG. 10 so as to engage with the pointed tip of the knife 31a with holding the sheet b therebetween.

There is provided a transversely extended bar 44a between and on the upper ends of pair of cylinders 43a, 43a. On said bar 44a there are mounted a pair of block members 45a, 45a, each having a threaded bore so as to engage with each of a pair of longitudinally extended screw rods 46a, 46a which are not shown in FIG. 10. Not shown end brackets between which said screw rod is extended are fixed to a machine frame 47. By rotating said screw rods 45a, 45a, position of the holder member 41a is longitudinally adjusted in any direction similar to the position adjustment mentioned above regarding the knife 31a.

Figure 11:
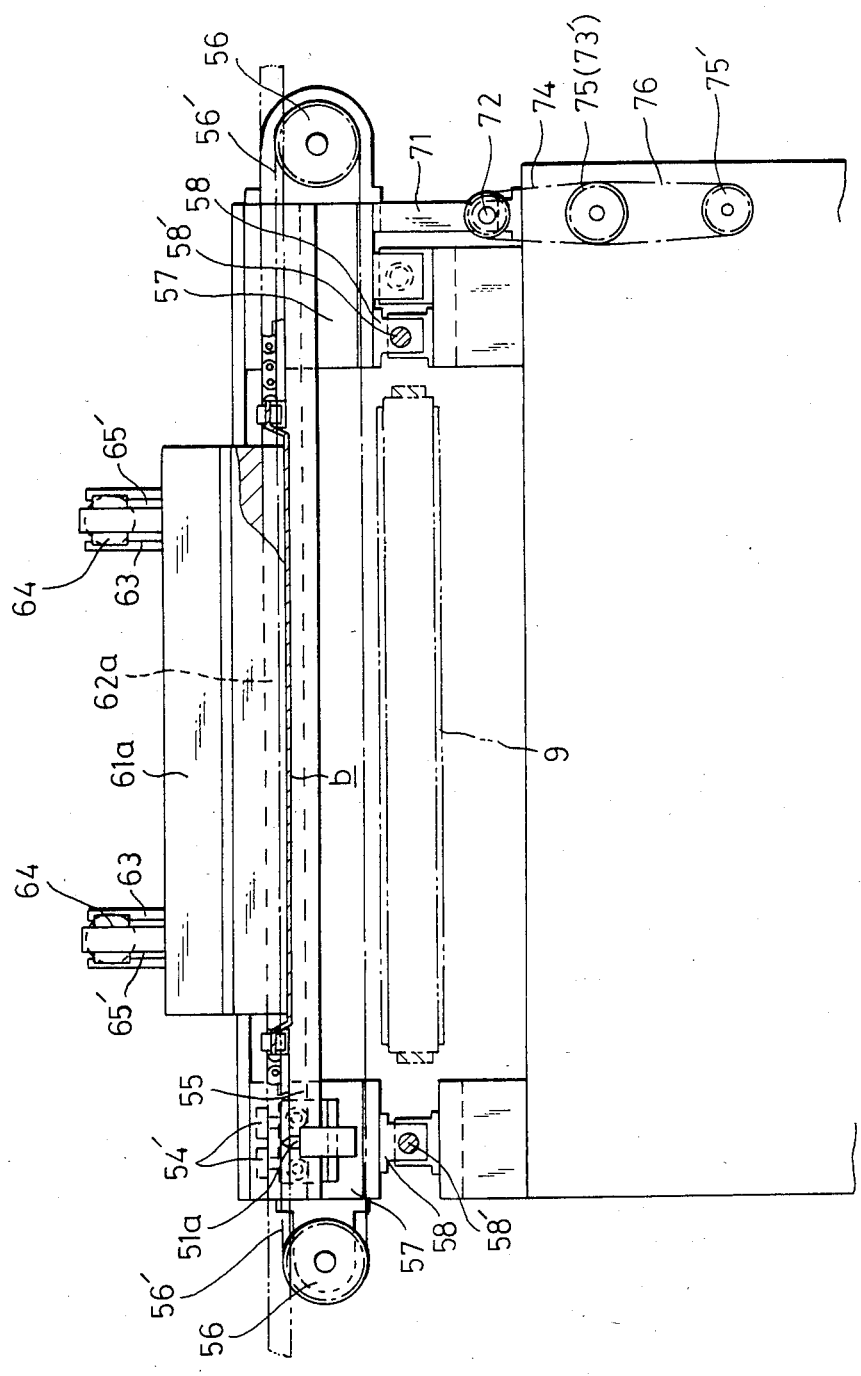

With reference also to FIG. 11 which is taken along a line XI—XI in FIG. 9 and seen in the direction shown by arrows, mechanisms for longitudinally movable transversely shiftable knife 51a (51b) and longitudinally extended transversely shiftable holder member 61a (61b) shall be explained in more detail.

The pointed tip knife 51a is exchangeably mounted on the free end of L-shaped member 52 of which the other end is fixed to a slidingly movable block 53 which is provided with a pair of small guide wheels 54, 54 respectively at the opposite sides thereof and another pair of small guide wheels 54', 54' on the top thereof so as to smoothly guided along a longitudinally (transversely in FIG. 11) extended guide member 55.

The assembly comprising the knife 51a, the L-shaped member 52 mounted with said knife 51a, the block 53 provided with said small guide wheels 54, 54; 54', 54' is shown at the left side in FIG. 11. There are provided two sprocket wheels 56, 56 around which is extended an endless link chains 56', of which one link is fixed with said knife assembly so that when either of said sprocket wheels 56 is driven by a reversible motor not shown, said knife 51a may longitudinally (transversely or from the left to the right in FIG. 11) be moved for longitudinally severing the plastic sheet b held by the holder member 61a having the extended channel 62a formed thereunder.

There are provided a pair of frame members 57, 57 fixed to said extended guide members 55 at the opposite ends thereof. Each of said frame members 57 is provided with a pair of block members 58 fixed thereunder, each having a bore so as to fit on a transversely extended bar 58' to be movable therealong, as best shown in FIG. 9. Either of said frame members 57 (the right frame member in the embodiment illustrated in FIG. 11) has a downwardly projected flange 59 fixed thereto. Said flange 59 is fixed to a free end of the piston rod of a cylinder-piston hydraulic device 59' so that when said device is actuated said frame member 57 and consequently said assembly comprising said knife 51a may be transversely moved as one unit. Thus the knife 51a may be transversely moved from the illustratedly forwarded position for severing to retracted position or vice versa and for adjusting its transverse position.

There are provided a pair of upwardly projecting flanges 63, each having the cylinder of a cylinder-piston hydraulic device 64 pivotally mounted thereon so that when actuating said hydraulic device 64 this device may angularly be moved. The free end of the piston rod of said hydraulic device is pivotally mounted with an arm 65 which is fixed to another arm 65' of which one end is pivoted at an upwardly projecting flange 66 which is fixed on the roof of said frame member 57. Said longitudinally extended holder member is fixed with the respective free ends of said pair of arms 65', 65' so that when actuating said hydraulic device 64 said longitudinally extended holder member 61a is angularly moved from the illustrated position to the retracted position shown in phantom lines in FIG. 9 or vice versa. It goes without saying that adjustment of the transverse position of said holder member may be made by the hydraulic cylinder-piston device 59' concurrently with adjustment of the knife 51a, since said holder member 61a is involved in one piece assembly so fars as transverse movement is concerned.

Different from the transversely movable knife 31a (31b, 31b', 31c) for transversely severing of the plastic sheet b, which is vertically movable between the forwarded severing position and the retracted waiting position and transversely shiftable for adjustment of the longitudinal position, the longitudinally movable knife 51a (51b) for longitudinally severing of the plastic sheet b is transversely moved between the forwarded severing position and the retracted waiting position and also transversely shifted for adjustment of the transverse position by means of the same hydraulic cylinder-piston device 59'. Thus, there must be particular consideration in respect of the transverse movement and the transverse shift of the knife 51a (51b).

For that purpose, there is provided a downwardly projected flange 71 fixed to the frame member 57. The free end of said flange 71 is adapted to abut on the head of a threaded bolt 72 so that any signal to be generated by said abutment may serve to deenergize said hydraulic device 59' for stopping further transverse movement of the piston rod thereof. Said bolt 72 is threadedly engaged with a threaded groove formed in the concerned machine frame wall so that revolving of said threaded bolt 72 causes transverse movement thereof. A sprocket wheel 73 is mounted on said threaded bolt 72. A reversible motor M' has another sprocket wheel 73' mounted on the output shaft thereof so as to cause said transverse movement of said threaded bolt 72 in either direction by revolvig thereof which is caused by driving of said motor M' in the corresponding direction via a sprocket chain 74 extended over said sprocket wheels 73, 73'. On the output shaft of said motor M' there is mounted another sprocket wheel 75 on which a sprocket chain 76 is extended also on a sprocket wheel 75' of an encoder 77.

Since said encoder 77 gives an output corresponding to the rotation of the motor M' in either direction and consequently to the transverse position of the head of the threaded bolt 72, the motor M' is to be energized to drive in the desired direction in reference to the encoder output so as to transversely move said bolt 72 for adjustment of the transverse position of the knife 51a (51b).

What is claimed is:

1. Apparatus for trimming a plastic sheet on which articles are formed comprising a frame means disposed at a cutting station, first knife means mounted on said frame means for movement in a longitudinally direction, first drive means operably connected to said first knife means for driving said first knife means in said longitudinal direction, said first knife means comprising a plurality of first knife-support means each supporting a first cutting knife, said first knife means further comprising adjusting means for adjusting the transverse position of said first knife-support means, second knife means mounted for movement in a transverse direction, second drive means operably connected to said second knife means for driving said second knife means in said transverse direction to cut said plastic sheet in said transverse direction, said second knife means comprising a plurality of second knife-support means each supporting a second cutting knife, said second knife means further comprising second adjustment means for adjusting the longitudinal position of said second knife support means, and actuating means for moving said second knife means between a severing position wherein said second knives engage said plastic sheet to cut the latter in said transverse direction as said second knife means are driven by said drive means and a retracted position wherein said second knives are disengaged from said plastic sheet, whereby said first and second knife means are operable to cut said plastic sheet in both longitudinal and transverse direction to thereby cut out desired portions from said plastic sheet.

2. Apparatus according to claim 1 further comprising chain means having clamps for gripping the longitudinal side edges of said plastic sheet and moving said plastic sheet longitudinally, said plastic sheet to be cut having formed portions with longitudinally and transversely extending ridges about said formed portions, said first and second knife means being operable to cut said plastic sheet between said formed portions and said ridges to cut out said formed portions so that the latter fall by gravity from said plastic sheet and the remaining portion of said plastic sheet from which said formed portions have been cut out is retained as one piece of plastic sheet which is longitudinally moved out of said cutting station by said chain means.

3. Apparatus according to claim 2, wherein said clamps engage and grip the longitudinal side edges of said plastic sheet outwardly of where said first knife means cuts said plastic sheet in said longitudinal direction such that said clamps grip said plastic sheet as said first knife means cuts said plastic sheet in said longitudinal direction.

4. Apparatus according to claim 3 further comprising conveyor means underlying said plastic sheet at said cutting station, said conveyor means receiving and conveying away said cut-out formed portion as the latter falls by gravity after being cut by said first and second knife means.

5. Apparatus according to claim 1, wherein at least one of said second knife-support means supports at least two of said second knives.

6. Apparatus according to claim 1, wherein said actuating means is operable to move said second knife means vertically between said severing position and said retracted position, said severing position being vertically higher than said retracted position.

7. Apparatus according to claim 1 further comprising first holder means having a plurality of first holder members each formed with an extended first groove extending in a longitudinal direction, first holder adjusting means for adjusting the transverse position of said first holder members such that said first grooves are aligned with said first knives, second holder means having a plurality of second holder members each formed with an extended second groove extending in a transverse direction, and second holder adjusting means for adjusting the longitudinal position of said second holder members such that said second grooves are aligned with said second knives.

8. Apparatus according to claim 7, wherein said first and second knives penetrate said plastic sheet, the parts of said first and second knives penetrating said plastic sheet being moveable within and along said extended first and second grooves respectively.

9. Apparatus according to claim 7 further comprising first holder actuating means for moving said first holder members between an abutting position and a withdrawn position, said first holder members in said abutting position abutting said plastic sheet so that said first grooves receive said first knives as said first knives cut said plastic sheet in said longitudinal direction.

10. Apparatus according to claim 9, wherein said first holder actuating means moves said holder members about a pivotal axis as said first holder means is moved between said abutting position and said withdrawn position.

11. Apparatus according to claim 9 further comprising second holder actuating means for moving said second holder members between an abutting position and a withdrawn position, said second holder members in the last said abutting position abutting said plastic sheet so that said second grooves receive said second knives as said second knives cut said plastic sheet in said transverse direction.

12. Apparatus according to claim 11, wherein said second holder actuating means is operable to move said second holder members vertically between said abutting position and said withdrawn position, said abutting position being vertically lower than said withdrawn position.

13. Apparatus according to claim 7, wherein said plastic sheet is fed horizontally to said cutting station, said first and second knive-support means being disposed to underlie said plastic sheet, said first and second holder members being disposed to overlie said plastic sheet.

* * * * *